(12) United States Patent
Kawakami

(10) Patent No.: US 9,261,691 B2
(45) Date of Patent: Feb. 16, 2016

(54) IMAGE PICKUP APPARATUS

(75) Inventor: Tomoaki Kawakami, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 482 days.

(21) Appl. No.: 13/578,854

(22) PCT Filed: May 25, 2011

(86) PCT No.: PCT/JP2011/002921
§ 371 (c)(1),
(2), (4) Date: Aug. 14, 2012

(87) PCT Pub. No.: WO2011/148636
PCT Pub. Date: Jan. 12, 2011

(65) Prior Publication Data
US 2012/0314051 A1    Dec. 13, 2012

(30) Foreign Application Priority Data
May 27, 2010  (JP) .................................. 2010-121752

(51) Int. Cl.
G02B 21/36    (2006.01)

(52) U.S. Cl.
CPC .................................. *G02B 21/361* (2013.01)

(58) Field of Classification Search
USPC .................................................... 348/79–80
See application file for complete search history.

(56) References Cited

U.S. PATENT DOCUMENTS

| | | | |
|---|---|---|---|
| 5,923,466 A * | 7/1999 | Krause et al. | 359/389 |
| 6,452,625 B1 * | 9/2002 | Kapitza | 348/80 |
| 6,594,075 B1 * | 7/2003 | Kanao et al. | 359/385 |
| 8,179,596 B2 | 5/2012 | Karasawa | |
| 2004/0263697 A1 * | 12/2004 | Fuse et al. | 349/5 |
| 2010/0110271 A1 | 5/2010 | Yanagita et al. | |

FOREIGN PATENT DOCUMENTS

| | | |
|---|---|---|
| EP | 1865073 A1 | 12/2007 |
| JP | 57-185005 A | 11/1982 |
| JP | 2002-182118 A | 6/2002 |
| JP | 2007-042933 A | 2/2007 |
| JP | 2008-510201 A | 4/2008 |
| JP | 2009-003016 A | 1/2009 |

(Continued)

OTHER PUBLICATIONS

Japanese Office Action for corresponding JP 2010-121752, mail date Apr. 8, 2014.
Japanese Office Action issued in corresponding Japanese Patent Application No. 2010-121752, dated Jul. 8, 2014.
European Extended Search Report issued in European counterpart application No. EP11786339.9, dated Nov. 21, 2013.

(Continued)

*Primary Examiner* — Michael Teitelbaum
(74) *Attorney, Agent, or Firm* — Rossi, Kimms & McDowell LLP

(57) ABSTRACT

An image pickup apparatus of the present invention includes a light source unit, an illumination optical system configured to introduce a light from the light source unit onto a plane to be illuminated, a sample stage configured to place an object on the plane to be illuminated, an image pickup optical system configured to form an image of the object placed on the plane to be illuminated, an image pickup element portion configured by disposing a plurality of image pickup elements on an image plane of the image pickup optical system, and a light shielding member configured to reduce entrance of a light to an area where the plurality of image pickup elements of the image pickup element portion are not disposed.

13 Claims, 10 Drawing Sheets

(56) References Cited

FOREIGN PATENT DOCUMENTS

| | | |
|---|---|---|
| JP | 2009-015047 A | 1/2009 |
| JP | 2009-063655 A | 3/2009 |
| JP | 2009-063657 A | 3/2009 |
| JP | 2009-294340 A | 12/2009 |
| JP | 2010-072016 A | 4/2010 |
| WO | 2006/023443 A2 | 3/2006 |
| WO | 2006-058187 A2 | 6/2006 |
| WO | 20091113647 A1 | 9/2009 |

OTHER PUBLICATIONS

Chinese Office Action for corresponding CN201180025347.6, mail date Jun. 4, 2014. English translation provided.

Notification of International Filing Date, International Search Report and Written Opinion for corresponding PCT/JP2011/002921. Mail date Aug. 16, 2011.

* cited by examiner

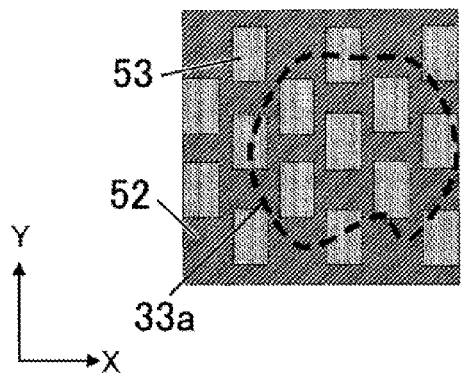
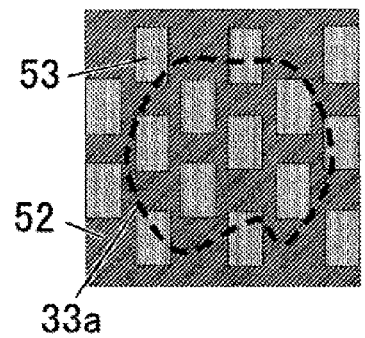
FIG. 6A          FIG. 6B
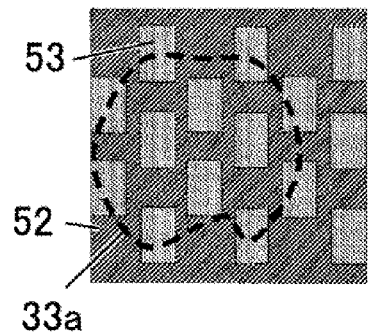
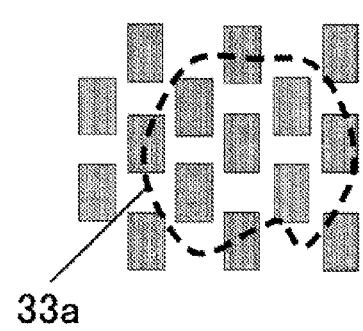
FIG. 6C          FIG. 6D
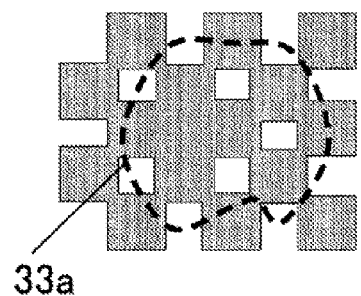
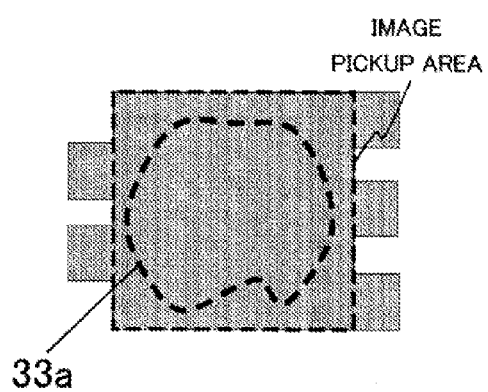
FIG. 6E          FIG. 6F

IMAGE PICKUP APPARATUS

This application is a U.S. National Phase Application of PCT International Application PCT/JP2011/002921 filed on May 25, 2011 which is based on and claims priority from JP2010-121752 filed on May 27, 2010 the contents of which is incorporated in its entirety by reference.

TECHNICAL FIELD

The present invention relates to an image pickup apparatus that takes an image of an object such as an object under test to display it on a display and that is suitably used for example as a microscope for taking an image of a sample to display it on the display to be observed.

BACKGROUND ART

Recently, a digital microscope which is capable of displaying shape information from whole of an object under test to a cell tissue as an electronic image including the scaling on a monitor has been proposed.

Patent Literature 1 discloses a virtual microscope that attaches a plurality of taken images obtained with high magnification and high resolution to form an image of the whole of the object under test. Generally, an image pickup method of obtaining images with high magnification one by one for the whole of the object under test takes much time. In microscope systems disclosed in Patent Literature 2 and Patent Literature 3, a high-resolution object lens is prepared although a field of view of observation is large. They disclose methods (apparatuses) of devising configurations of image pickup units to take an image with high magnification at high speed.

Generally, it is very difficult to prepare an image pickup element having a size in which images can be simultaneously taken for a wide field of view. Therefore, in the microscope systems disclosed in Patent Literature 2 and Patent Literature 3, a plurality of image pickup elements are disposed in the image pickup unit in order to take an image having of a wide field of view. In these microscope systems, a sample or the image pickup unit is driven more than once in one plane while taking images to form a whole image by synthesizing the taken images. Thus, the microscope system that obtains the shape information from the whole of the object under test to the cell tissue as an image is disclosed.

CITATION LIST

Patent Literature

[PTL 1] Japanese Patent Laid-Open No. 2008-510201
[PTL 2] Japanese Patent Laid-Open No. 2009-003016
[PTL 3] Japanese Patent Laid-Open No. 2009-063655

SUMMARY OF INVENTION

Technical Problem

When a plurality of image pickup elements are arrayed on the image pickup surface as these microscopes, an image of the sample (the object under test) is also formed between the plurality of image pickup elements. Generally, an electric basement or a mechanical unit is formed between the image pickup elements. Therefore, when the imaged light related to the sample enters the electric basement or the mechanical unit, a reflected light or a scattering light is generated from the electric basement or the mechanical unit. The reflected light or the scattering light in this time may illuminate other electric basement, mechanical unit, a lens of the image pickup optical system, or the like to finally enter the image pickup element. The reflected light or the scattering light in this time is an unnecessary light (a harmful light) for taking an image of the sample, and causes a deterioration of the image quality.

In the microscope system, it is strongly desired that an abnormal portion of the object under test is detected with high accuracy, and the deterioration of the image quality caused by the harmful light is a major problem to be solved.

The present invention provides an image pickup apparatus capable of reducing a deterioration of an image quality caused by a harmful light generated by reflection or scattering in a non-image pickup area between image pickup elements in arranging a plurality of image pickup elements to obtain and observe an image.

Solution to Problem

An image pickup apparatus of the present invention includes a light source unit, an illumination optical system configured to introduce a light from the light source unit onto a plane to be illuminated, a sample stage configured to place an object on the plane to be illuminated, an image pickup optical system configured to form an image of the object placed on the plane to be illuminated, an image pickup element portion configured by disposing a plurality of image pickup elements on an image plane of the image pickup optical system, and a light shielding member configured to reduce entrance of a light to an area where the plurality of image pickup elements of the image pickup element portion are not disposed.

Advantageous Effects of Invention

According to the present invention, an image pickup apparatus capable of reducing a deterioration of an image quality caused by a harmful light generated by reflection or scattering in a non-image pickup area between image pickup elements in arranging a plurality of image pickup elements to obtain and observe an image can be obtained.

BRIEF DESCRIPTION OF DRAWINGS

FIG. 6A is a diagram describing an obtainment of a whole image by taking a plurality of images in FIG. 1.

FIG. 6B is a diagram describing an obtainment of a whole image by taking a plurality of images in FIG. 1.

FIG. 6C is a diagram describing an obtainment of a whole image by taking a plurality of images in FIG. 1.

FIG. 6D is a diagram describing an obtainment of a whole image by taking a plurality of images in FIG. 1.

FIG. 6E is a diagram describing an obtainment of a whole image by taking a plurality of images in FIG. 1.

FIG. 6F is a diagram describing an obtainment of a whole image by taking a plurality of images in FIG. 1.

DESCRIPTION OF EMBODIMENTS

Figure 1:
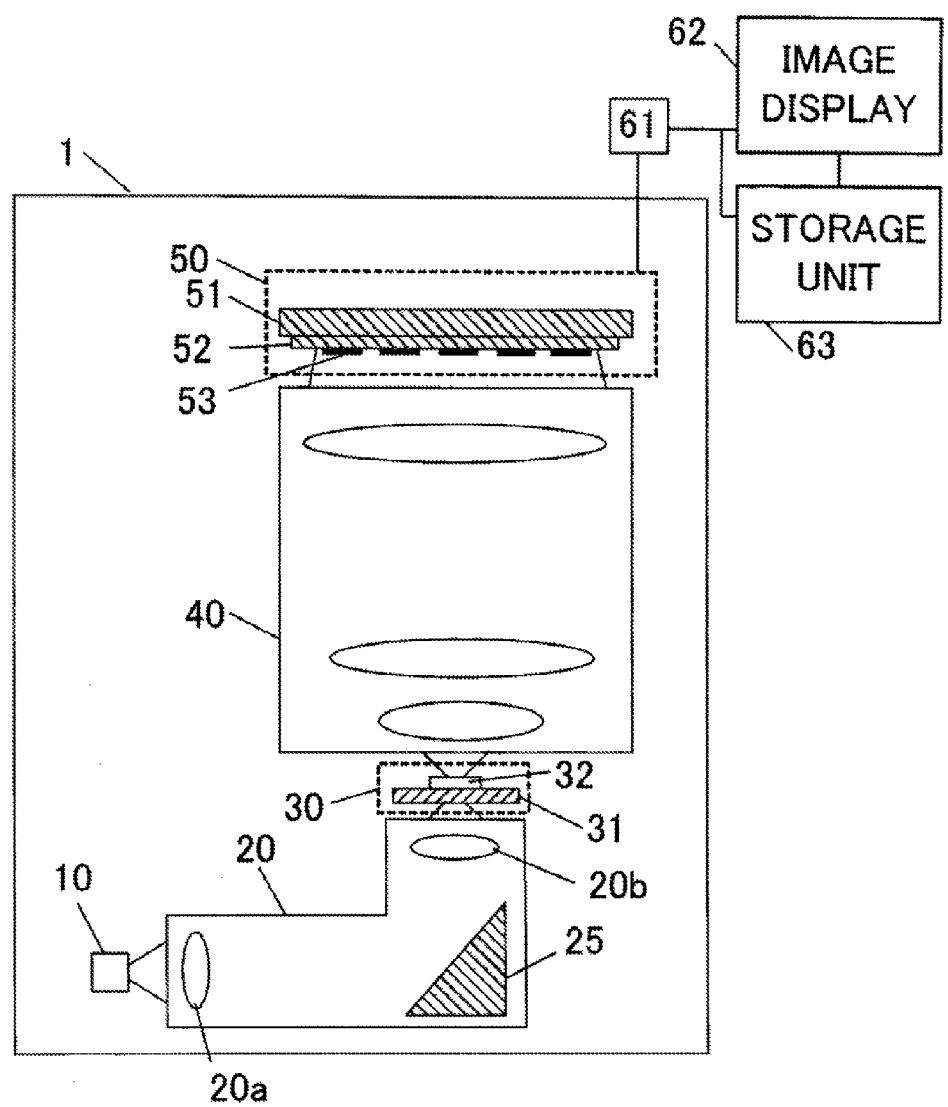
FIG. 1 is a diagram describing an overall structure of an image pickup apparatus of the present invention.

An image pickup apparatus of the present invention includes a light source unit 10, an illumination optical system 20 that introduces a light from the light source unit 10 onto a plane to be illuminated on which an object being observed 32 is disposed, and a sample stage that is movable in a plane of the plane to be illuminated where the object being observed is disposed. Furthermore, the image pickup apparatus includes an image pickup optical system 40 that images the object on the plane to be illuminated. In addition, the image pickup apparatus includes an image pickup element portion (an image pickup unit) 50 in which a plurality of image pickup elements 53 are disposed on an image plane of the image pickup optical system 40.

Then, a light shielding member preventing that a light enters a region where the plurality of image pickup elements 53 of the image pickup element portion 50 is disposed on at least one of an area at a light incident side of the image pickup element portion 50, the plane to be illuminated, or a plane conjugate with respect to the plane to be illuminated.

In the image pickup apparatus of the present invention, a relative position of at least one of the image pickup element portion 50, the light receiving member 60, and the plane to be illuminated in a plane orthogonal to an optical axis is changed to take a plurality of images of the object on the plane to be illuminated. The image pickup apparatus includes an image processor 61 that synthesizes the plurality of taken images and an image display 62 that displays an image processed by the image processor 61. The image pickup apparatus also includes a storage unit 63 that stores image information processed by the image processor 61.

First Embodiment

FIG. 1 is a schematic diagram of an image pickup apparatus using a transmissive microscope in a first embodiment of the present invention. In FIG. 1, an image pickup apparatus 1 includes a light source (a light source unit) 10, an illumination optical system 20, a sample unit 30, an image pickup optical system 40, and an image pickup unit 50. The image pickup apparatus 1 takes an image of a sample 32 with an image pickup element 53.

The light source 10 emits a light to illuminate the sample 32 of the sample unit 30, and is configured by a halogen lamp, a xenon lamp, an LED, or the like. The illumination optical system 20 includes optical members 20a and 20b that appropriately shape a diameter of the light from the light source 10 to introduce it to the sample unit 30 and a mirror that bends an optical path traveling in a horizontal direction to a perpendicular direction. The sample unit 30 includes a sample stage 31 that is movable in a plane orthogonal to an optical axis and the sample 32.

In FIG. 1, the sample 32 is illustrated so as to only include a slide glass, but actually it is integrally configured by the slide glass, an object under test, a cover glass, and the like. The image pickup optical system 40 is configured by an imaging optical system having an optical magnification of β times which is used for taking an image of the sample 32 by the image pickup unit 50. The sample unit 30 and the image pickup unit 50 (for more detail, the sample 32 and the image pickup element 53) with respect to the image pickup optical system 40 are disposed so as to have a conjugate relation of an object plane and an image plane.

The image obtained by the image pickup unit 50 is processed by the image processor 61 to be displayed on the image display 62. The storage unit 63 stores the image information processed by the image processor 61, image information displayed on the image display 62, and the like.

Figure 2A:
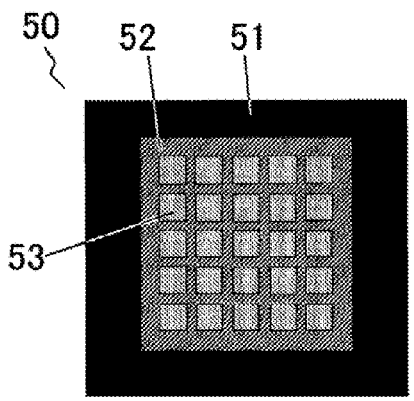
FIG. 2A is a diagram describing arrangements of an electric basement and image pickup elements illustrated in FIG. 1.
Figure 2B:
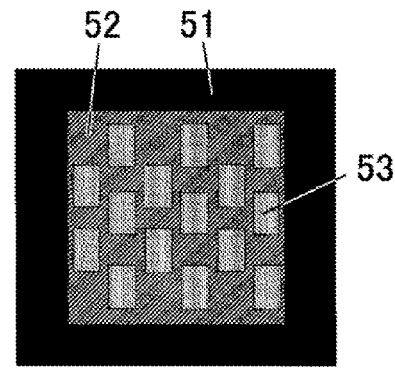
FIG. 2B is a diagram describing arrangements of an electric basement and image pickup elements illustrated in FIG. 1.

The image pickup unit 50 includes an image pickup stage 51, an electric basement 52, and the plurality of image pickup elements 53. The plurality of image pickup elements 53 are arranged on the electric basement 52 as illustrated in FIGS. 2A and 2B.

Figure 3:
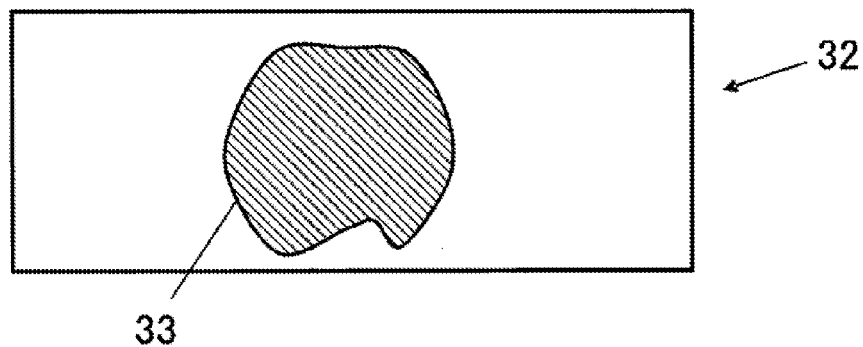
FIG. 3 is a diagram describing an object under test in a sample unit illustrated in FIG. 1.
Figure 4:
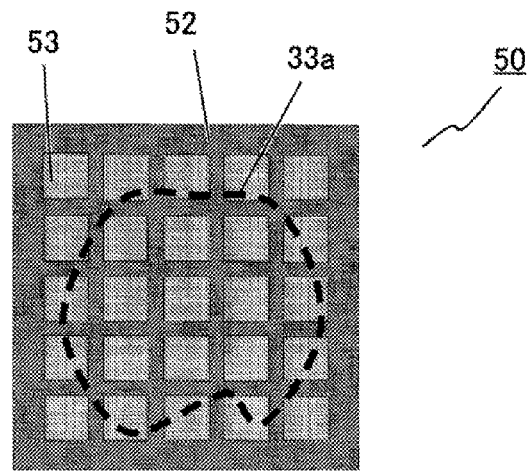
FIG. 4 is a diagram describing an image of the object under test in an image pickup unit illustrated in FIG. 1.

FIG. 3 is a diagram describing an object under test 33 that is an object being observed. In the sample 32, an image 33a of the object under test 33 that is the object being observed is imaged on the image pickup unit 50 by the image pickup optical system 40 as indicated by a dotted line of FIG. 4. The plurality of image pickup elements 53 are disposed on the electric basement 52 at intervals for respective adjacent image pickup elements. At the time of taking an image, a plurality of images are taken while the sample 32 or the image pickup unit 50 are relatively driven in a plane perpendicular to the optical axis of the image pickup optical system 40, and the images are attached based on an overlapped portion to form a taken image of whole of the sample 32.

Figure 5A:
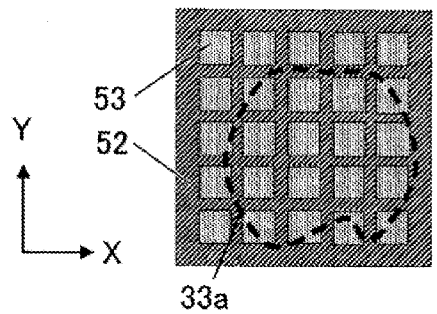
FIG. 5A is a diagram describing an obtainment of a whole image by taking a plurality of images in FIG. 1.
Figure 5B:
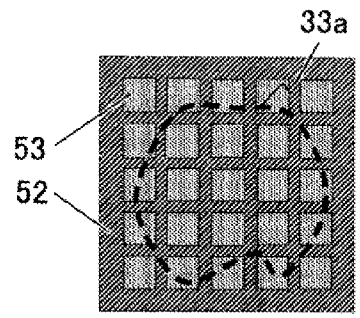
FIG. 5B is a diagram describing an obtainment of a whole image by taking a plurality of images in FIG. 1.
Figure 5C:
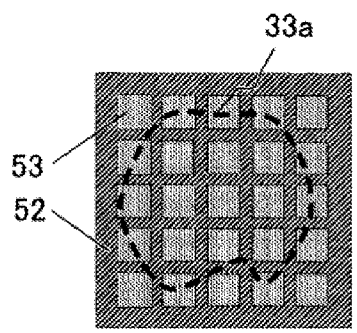
FIG. 5C is a diagram describing an obtainment of a whole image by taking a plurality of images in FIG. 1.
Figure 5D:
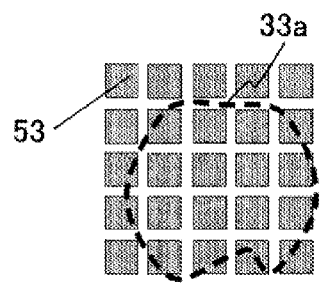
FIG. 5D is a diagram describing an obtainment of a whole image by taking a plurality of images in FIG. 1.
Figure 5E:
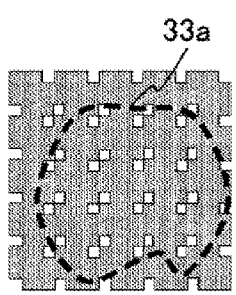
FIG. 5E is a diagram describing an obtainment of a whole image by taking a plurality of images in FIG. 1.
Figure 5F:
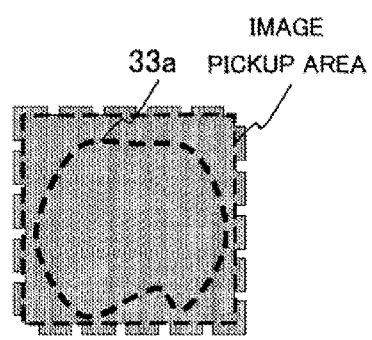
FIG. 5F is a diagram describing an obtainment of a whole image by taking a plurality of images in FIG. 1.

For example, in FIGS. 5A to 5F, the plurality of image pickup elements 53 are disposed in a matrix and the image is taken each time while the sample 32 is displaced in an oblique direction in the drawing to attach the taken image. FIGS. 5A to 5C illustrate a relationship between the image pickup elements 53 and the image 33a of the object under test 33 in the image pickup unit 50 when the sample 32 is displaced half of an effective size of the image pickup elements 53 in X and Y directions perpendicular to the optical axis. When a first image is taken at a position of FIG. 5A, only areas where the image pickup elements 53 exist of the image 33a of the object under test 33 are discretely imaged as illustrated in FIG. 5D. Subsequently, when the sample 32 is displaced to take a second image at a position of FIG. 5B, a portion illustrated in FIG. 5E is imaged in combination with the previously-obtained image. Finally, when the sample 32 is further displaced to move the sample 32 to a position of FIG. 5C to take an image and the image is overlapped with the images obtained by taking the previous two images, an image of the whole of the image pickup area illustrated in FIG. 5F can be created.

In the present embodiment, a method in which the plurality of image pickup elements 53 are disposed in a zigzag arrangement as illustrated in FIGS. 6A to 6C and the image is taken each time while the sample 32 is displaced by an effective size in an X direction of the image pickup elements 53 to attach the taken images as illustrated in FIGS. 6D to 6F can also be applied. In repeating taking the image while moving the sample 32 in the X direction, the image pickup elements 53 are disposed so as to be overlapped to attach images when viewing in the X direction.

Figure 7A:
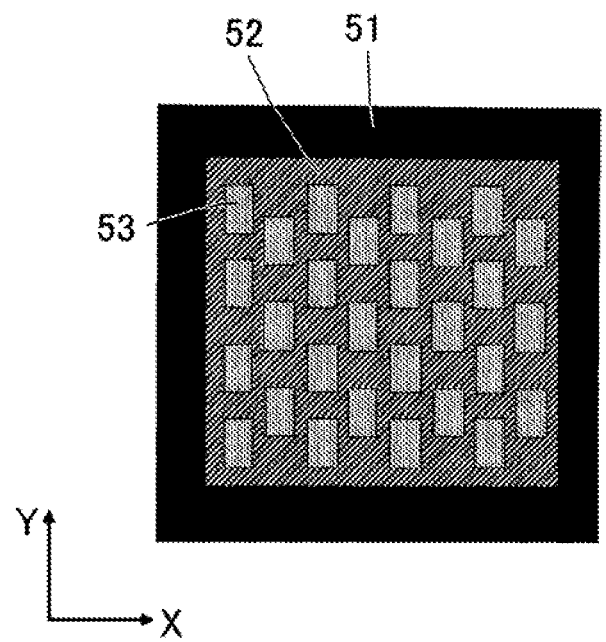
FIG. 7A is a diagram describing arrangements of the image pickup elements and a light shielding member in FIG. 1.

An example in which the plurality of image pickup elements 53 are arrayed is described as illustrated in FIGS. 6A to 6F. In the embodiment, a field of view of the sample 32 that is to be observed is 20 mm×20 mm, and an optical magnification is 10 times as large. In this case, it is necessary to take an image of an area of 200 mm×200 mm in the image pickup unit 50. In order to taken an image of this area, a case where an image pickup element having an effective area 24×36 mm is used is considered. Considering an overlapped portion having a size that is 20 percent of a size of the image pickup element 53 to attach the images, the image pickup elements 53 may be alternately arranged so that eight image pickup elements exist in the X direction and three or four image pickup elements exist in the Y direction with respect to the X direction as illustrated in FIG. 7A. In this case, a true effective area is 206.4 mm in the X direction and 208.8 mm in the Y direction. When the overlapped portion is finely adjusted so as to be 22.7% in the X direction and 24% in the Y direction, a desired image pickup area can be formed.

In FIG. 7A, the plurality of image pickup elements 53 are disposed in the X direction at a pitch of 1.2DX with respect to a length DX of the image pickup element 53 in the X direction. The plurality of image pickup elements 53 are disposed in the Y direction at a pitch of 1.6DY with respect to a length DY in the Y direction. Adjacent image pickup elements of the image pickup elements arrayed in the X direction are displaced by 0.8DY pitch in the Y direction.

Figure 12:
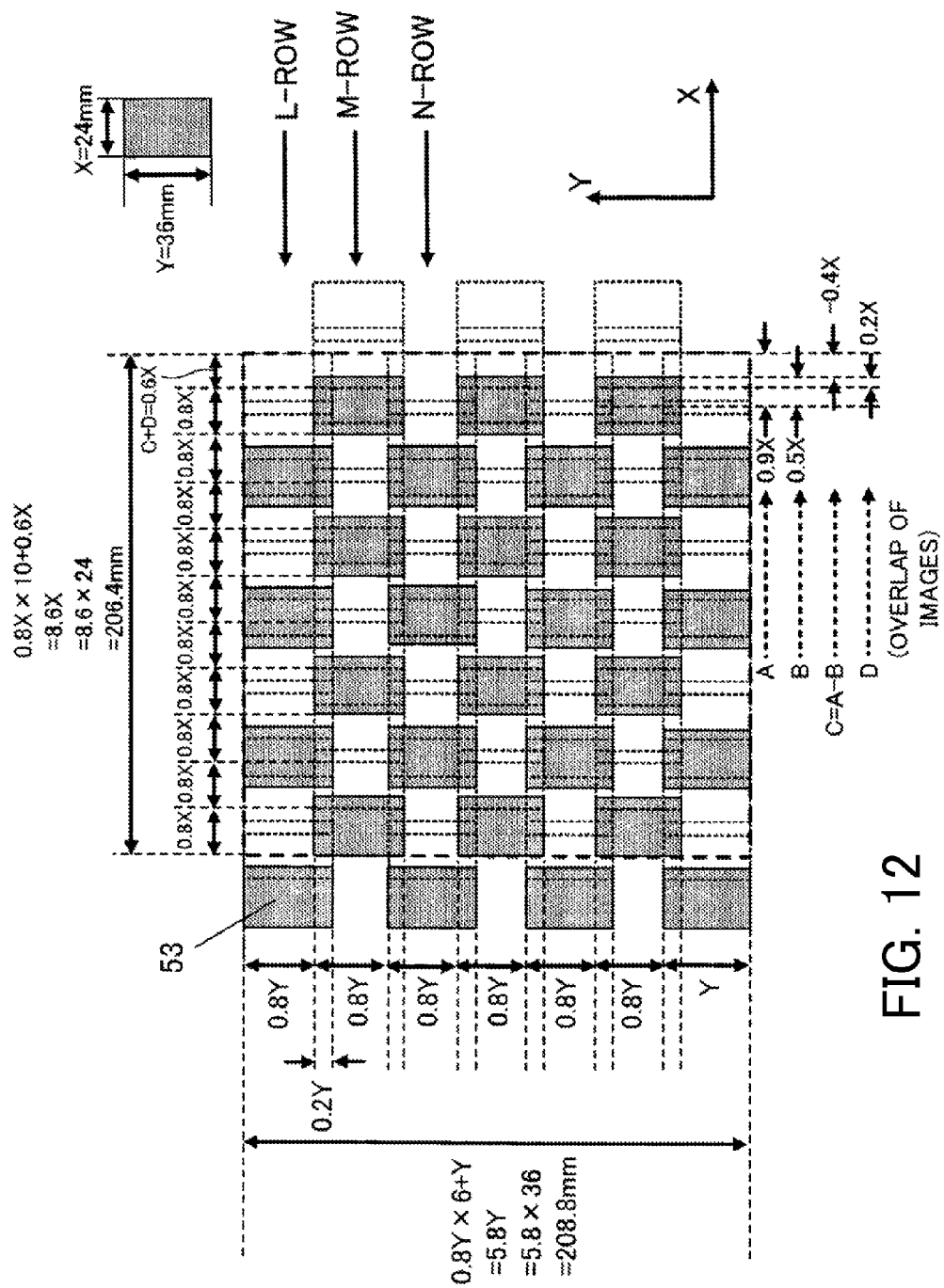
FIG. 12 is a diagram describing an image pickup unit in FIG. 1.

FIG. 12 is a diagram describing an arrangement of the image pickup elements 53 in this case. The image pickup element 53 has a length of 24 mm in the X direction and a length of 36 mm in the Y direction. The lengths in the X and Y directions of the image pickup element 53 are represented as X and Y, respectively. In this case, the image pickup elements 53 are disposed at a pitch of 1.2X in the X direction and at a pitch of 1.6Y in the Y direction. When focusing on the X direction, the image pickup elements after the M-row are disposed so as to be positioned at a middle of the image pickup elements of the L-row, and also are disposed so as to be overlapped with one of the image pickup elements by 20 percent in the Y direction. When focusing on the Y direction, the image pickup element after the M-row is overlapped with one of the image pickup elements by 20 percent.

In FIG. 12, the position relation of the X and Y directions of each image pickup element is indicated by using X and Y. An area surrounded by a dotted line is a synthetic image pickup area obtained by using the plurality of image pickup elements. In FIG. 12, a size of the synthetic image pickup area is as follows.

$$X \text{ direction: } 8.6X = 8.6 \times 24 = 206.4 \text{ (mm)}$$

$$Y \text{ direction: } 5.8Y = 5.8 \times 36 = 208.8 \text{ (mm)}$$

Figure 7B:
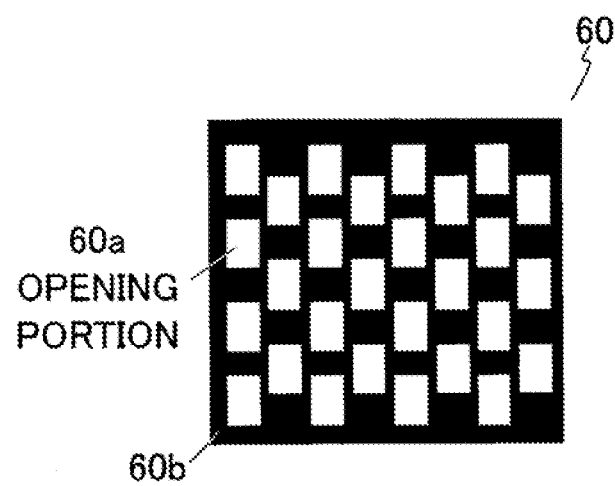
FIG. 7B is a diagram describing arrangements of the image pickup elements and a light shielding member in FIG. 1.

In the image pickup apparatus using the microscope of the first embodiment, the light shielding member 60 as illustrated in FIG. 7B is disposed in an optical path so that the light from the sample 32 only enters the image pickup elements 53.

In the present embodiment, when the light shielding member is disposed in the optical path, it has a plate shape configured by an opening portion that is an area corresponding to an effective light receiving area in which the plurality of image pickup elements receive the light and a light shielding portion that is an area other than the opening area. Specifically, the light receiving member 60 includes an opening portion 60a through which the light passes and a light receiving portion 60b in which the light is shielded. However, since there is a case where the X and Y directions are reversed in accordance with the number of imaging times, it may be disposed appropriately in accordance with the image pickup optical system 40. It is preferable that a position where the light shielding member 60 is disposed is a position of at least one of an image plane (a plane on which the image pickup elements 53 are disposed) and a plane conjugate with the image plane of the image pickup optical system 40 or the illumination optical system 20. As the plane conjugate with the image plane, there is an imaging plane other than the imaging plane of the image pickup optical system or an object plane (a plane on which the sample 32 is disposed). If the light shielding portion 60b of the light shielding member 60 completely absorbs the light, it can be disposed on the image plane. When the light shielding member 60 is disposed at a position other than the image plane, its size needs to be determined by considering an optical magnification for the image pickup unit 50.

For example, when the light shielding member 60 is disposed in the sample unit 30, the imaging magnification of the image pickup optical system 40 is set to be β. In this case, the light shielding member 60 which has a size of whole of the light shielding member 60, sizes of the opening portion 60a and the light shielding portion 60b, and the interval of the opening portions 60a all magnified by 1/β times may be disposed.

The light entering the periphery of the image pickup elements is reduced by the light shielding member 60. Thus, the light entering the electric basement 52 that is provided at the periphery of the image pickup element 53 is reflected, and is further reflected by the other member to reduce the flare entering the image pickup element 53, and as a result the deterioration of the image quality is reduced.

The illumination light to the sample 32 may be set to correspond to the image pickup element 53 instead of shielding the imaging light. In order to be discretely illuminated, the light shielding member may be disposed on a plane conjugate with the plane to be illuminated 32 in the illumination optical system 20.

Figure 8:
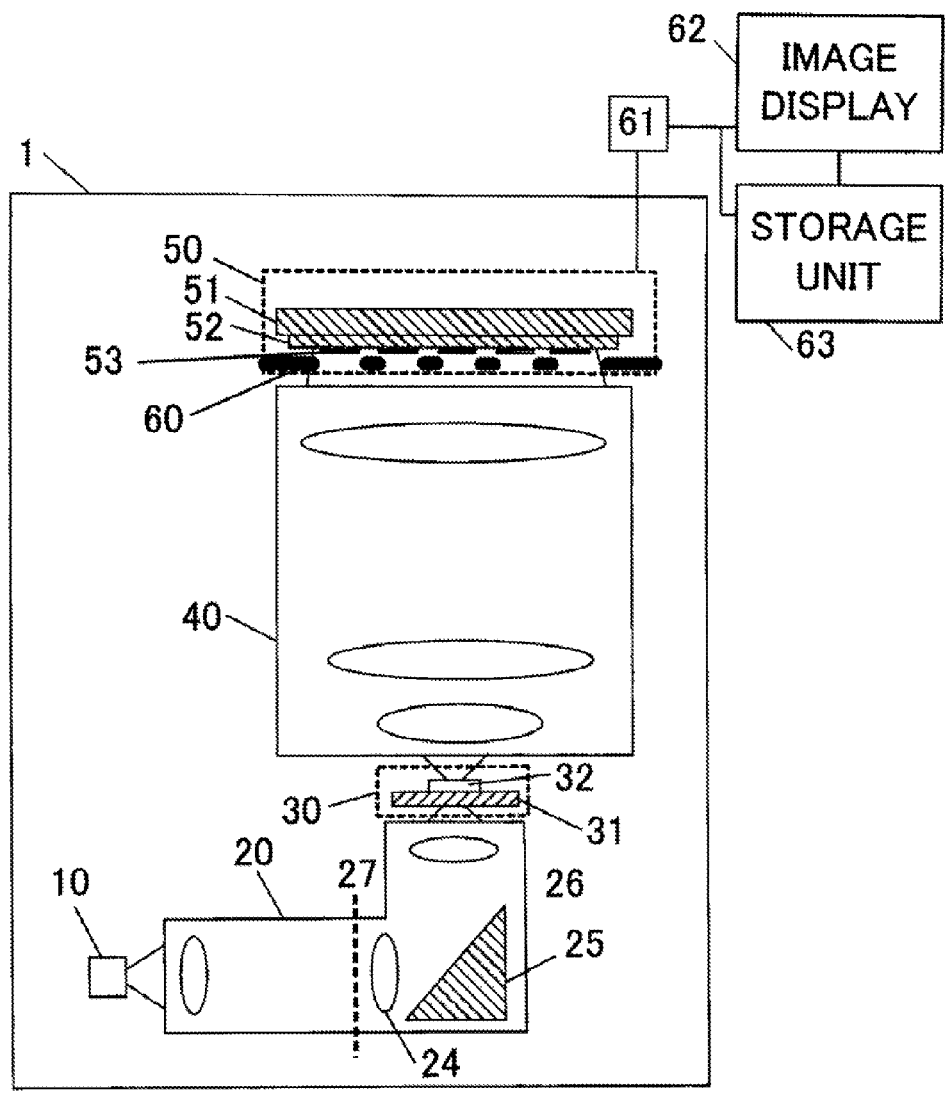
FIG. 8 is a diagram describing an overall structure of an image pickup apparatus in which the light shielding member is disposed.

FIG. 8 is a schematic diagram of a main part when the light shielding member is provided in the optical path of the illumination optical system 20. The sample 32 and a plane 27 have a conjugate relation with respect to imaging optical systems 24 and 26. When the optical magnification of the conjugate plane 27 and the plane to be illuminated (the plane on which the sample 32 is disposed) is β', the light shielding member 60 which has a shape where all of the size of whole of the light shielding member 60, the size of the opening, the interval of the opening portions 60a, and the like are magnified by times $1/(\beta \times \beta')$ times may be disposed on the conjugate plane 27.

In this case, an image is taken while at least one of the sample unit 30 and the light shielding member 60 moves in a plane perpendicular to the optical axis. Alternatively, the image may also be taken while the light shielding member 60 and the image pickup unit 50 move in a plane perpendicular to the optical axis. In this case, however, a moving amount of the light shielding member 60 is $1/(\beta \times \beta')$ with respect to a moving amount of the image pickup unit 50.

In the present embodiment, two or more light shielding members may also be disposed in the optical path. According to this configuration, a harmful light can be effectively reduced.

Second Embodiment

In an image pickup apparatus using a microscope of the present invention, the illumination optical system 20 may also be configured so that the light enters only the plurality of image pickup elements without using the light shielding member. The illumination in accordance with the arrangement of the image pickup elements may also be performed by the illumination optical system 20.

Figure 9:
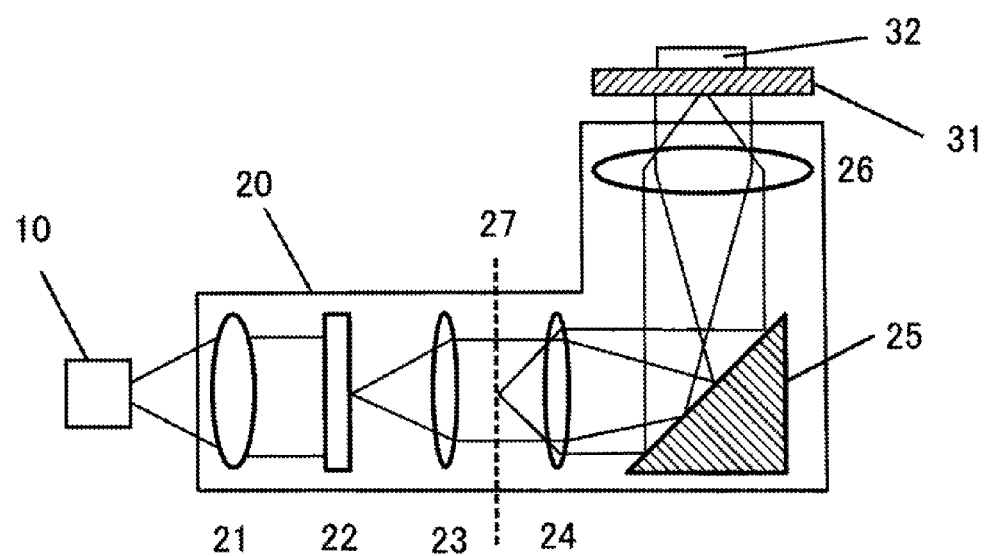
FIG. 9 is a diagram describing an illumination optical system that performs an illumination in accordance with an arrangement of the image pickup elements.

In the illumination optical system illustrated in FIG. 9, a light from the light source unit 10 is shaped to a parallel light by a collimater 21 to enter a diffraction optical element 22. The Fourier transform is performed for the diffracted light from the diffraction optical element 22 by a Fourier transform lens 23 on an intermediate image plane 27 to form an image. On the intermediate image plane 27, a light distribution that can illuminate a plurality of rectangle areas in accordance with the arrangement of the image pickup elements 53 is obtained. This is the same as a light distribution on the plane 27 when the light shielding member 60 is disposed on the plane 27 of FIG. 8. The sample 32 of the sample unit 30 is illuminated by setting an optical magnification on the intermediate image plane of the plane 27 to $\beta'$ times. This illumination is designed so that the light only comes onto the image pickup elements 53 by the image pickup optical system 40. Therefore, an unnecessary light for taking the image does not enter the image pickup elements 53.

In this embodiment, since the light is only shaped to be illuminated onto an effective portion for taking the image by the diffraction optical element 22, the optical power (power consumption) can be suppressed compared with a case where the light shielding member is used. The diffraction optical element 22 can be made by a known method using CG (computer graphics) or the like.

Third Embodiment

Figure 10:
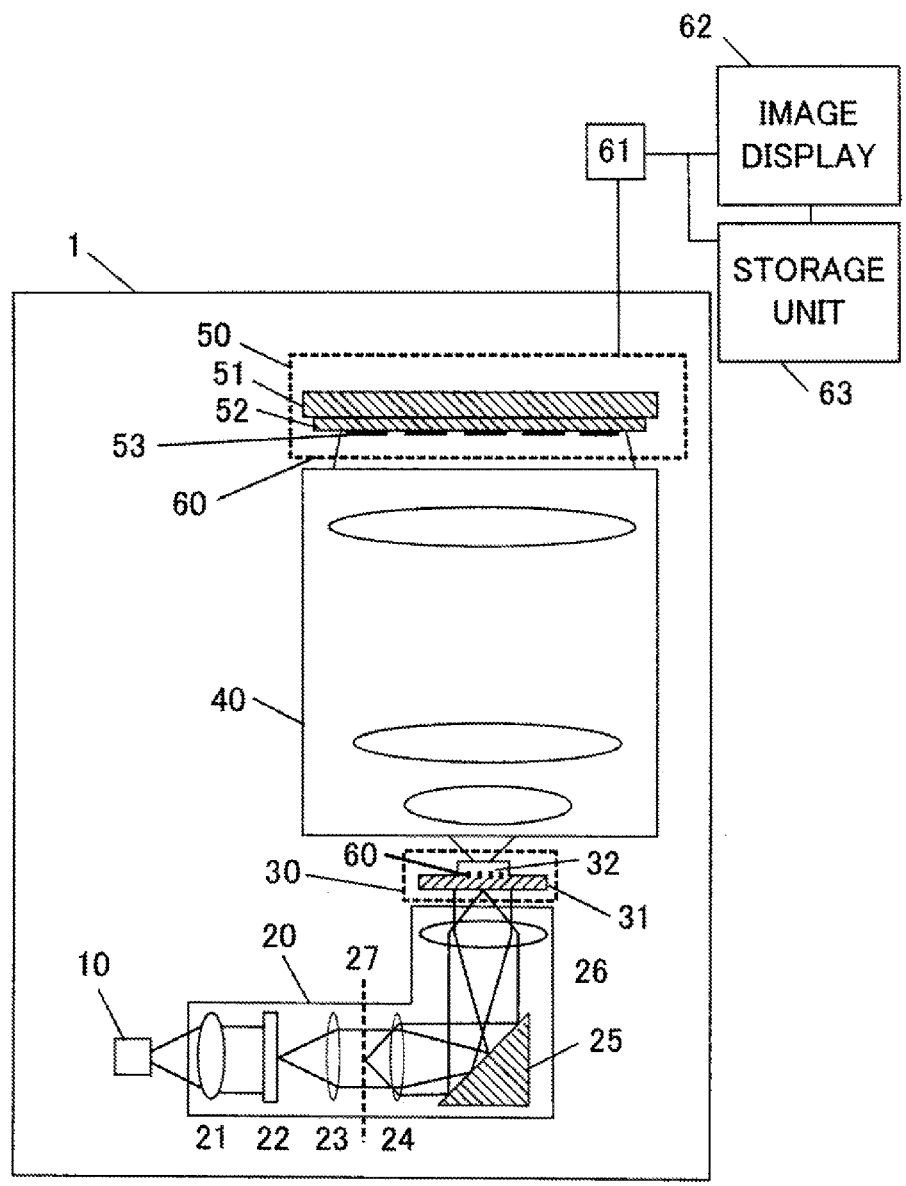
FIG. 10 is a diagram describing an overall structure of an image pickup apparatus which has an illumination optical system that performs an illumination in accordance with an arrangement of the image pickup elements and a light shielding member in the present invention.
Figure 11:
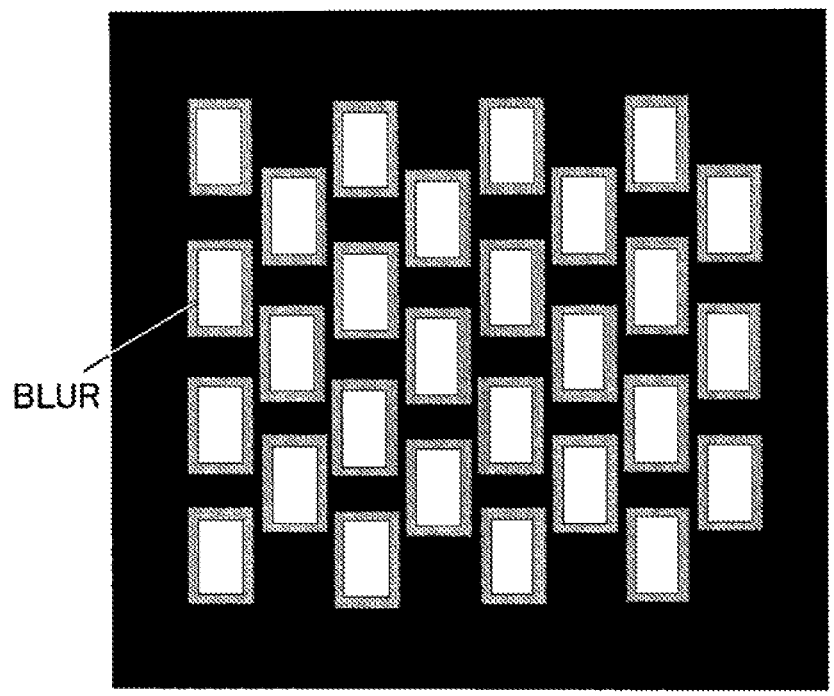
FIG. 11 is a diagram describing a sample surface illuminance distribution when a blur is generated in the image pickup unit.

There is a case where the light entering the sample unit 30 is slightly blurred by the diffraction efficiency of the diffraction optical element 22, the aberrations of the imaging optical systems 24 and 26, and the like. In the case, the light shielding member 60 described in the first embodiment may also be combined. In a microscope illustrated in FIG. 10, a light from the light unit 10 is changed to a parallel light by a collimater 21 to enter the diffraction optical element 22. The diffraction optical element 22 forms a plane that illuminates a plurality of rectangular shapes on the intermediate image plane 27. The imaging optical systems 24 and 26 illuminate the sample 32 with the light distribution of the intermediate image plane 27. In this case, a blur may be generated in the illumination distribution of the sample 32 as illustrated in FIG. 11 for example. In this case, the light shielding member 60 may be disposed at the sample 32 to shield the unnecessary light generated by the blur. Then, the light passing through the image pickup optical system 40 from the sample 32 enters the image pickup elements 53 in the image pickup unit 50. As a result, the light which is unnecessary for taking the image can be further reduced.

As described above, in the image pickup apparatus in which the plurality of image pickup elements of each embodiment, the light which images on an area where the image pickup elements are not disposed is shielded. Alternatively, the image pickup apparatus is configured so as not to illuminate the area where the image pickup elements are not disposed. Thus, the light which is fundamentally unnecessary does not enter the image pickup unit. As a result, since the reflection or the scattering generated by the entrance of the light on an extra area can be suppressed, the quality of the taken image can be improved. Furthermore, since the influence caused by the reflection on the electric basement in the image pickup unit or the like can be reduced, the degree of freedom of arranging the electric wire or the mechanical unit can be improved.

As described above, the case where the present invention is applied to microscope is described as an embodiment of the optical system of the present invention. The transmissive optical system that forms an image of the transmitted light of the light illuminated on the sample on an image plane is described in each embodiment, but a reflective optical system may also be adopted. The embodiments are similarly applied to an image pickup apparatus other than the microscope.

REFERENCE SIGNS LIST

1 SCHEMATIC DIAGRAM OF IMAGE PICKUP APPARATUS
10 LIGHT SOURCE
20 ILLUMINATION OPTICAL SYSTEM
30 SAMPLE UNIT
31 SAMPLE STAGE
32 SAMPLE
33 OBJECT UNDER TEST
40 IMAGE PICKUP OPTICAL SYSTEM
50 IMAGE PICKUP UNIT
52 ELECTRIC BASEMENT
53 IMAGE PICKUP ELEMENT
60 LIGHT SHIELDING MEMBER

The invention claimed is:
1. An image pickup apparatus comprising:
a light source unit;
an illumination optical system configured to introduce a light from the light source unit onto a plane to be illuminated;
an image pickup optical system configured to form an image of an object placed on the plane to be illuminated;
an image pickup portion including a plurality of image pickup elements that take the image of the object via the image pickup optical system; and
a light shielding member having a plurality of opening portions for allowing light to be entered into an effective light receiving area of each of the plurality of image pickup elements to pass therethrough, the plurality of opening portions and the effective light receiving areas of the plurality of image pickup elements being disposed in a one-to-one relation,
wherein the light shielding member is configured to block light to be entered into an area other than the effective light receiving area of each of the plurality of image pickup elements in the image pickup portion.

2. The image pickup apparatus according to claim 1, wherein the light shielding member is disposed on at least one of light incident side of the image pickup portion, the plane to be illuminated, and a plane conjugate with the plane to be illuminated.

3. The image pickup apparatus according to claim 1, wherein the light shielding member has a plate shape where an area other than the plurality of opening portions is a light shielding portion that shields light to be entered into the area other than the effective light receiving area in the image pickup portion.

4. The image pickup apparatus according to claim 1, further comprising:
   an image processor configured to change a relative position of at least one of the image pickup portion, the light shielding member, and the plane to be illuminated to synthesize a plurality of images obtained by taking a plurality of images of the object on the plane to be illuminated; and
   an image display configured to display an image processed by the image processor.

5. The image pickup apparatus according to claim 4, further comprising a storage unit configured to store image information processed by the image processor.

6. The image pickup apparatus according to claim 1, further comprising:
   a sample stage configured to place the object on the plane to be illuminated.

7. The image pickup apparatus according to claim 1, wherein the plurality of image pickup elements is disposed on an image plane of the image pickup optical system.

8. The image pickup apparatus according to claim 1, wherein the plurality of image pickup elements is disposed on an identical plane orthogonal to an optical axis of the image pickup optical system.

9. The image pickup apparatus according to claim 6, wherein the sample stage is disposed between the light shielding member and the light source unit.

10. The image pickup apparatus according to claim 1, wherein an area where the plurality of image pickup elements of the image pickup portion are not disposed includes a first area between two immediately-adjacent image pickup elements of the plurality of image pickup elements.

11. The image pickup apparatus according to claim 1, wherein the light shielding member includes an opening portion and a light shielding portion disposed about the opening portion, the opening portion being permanently open.

12. The image pickup apparatus according to claim 1, wherein the illumination optical system illuminates only an area corresponding to the effective light receiving area in the plane to be illuminated.

13. The image pickup apparatus according to claim 1, wherein the illumination optical system includes a diffractive optical element for introducing light from the light source unit onto only an area corresponding to the effective light receiving area in the plane to be illuminated.

* * * * *